United States Patent
Boyd et al.

(10) Patent No.: US 9,329,312 B2
(45) Date of Patent: May 3, 2016

(54) APPROACHES TO CONTROL COLOR MURA IN OPTICAL FILMS

(71) Applicant: 3M INNOVATIVE PROPERTIES COMPANY, Saint Paul, MN (US)

(72) Inventors: Gary T. Boyd, Woodbury, MN (US); Qingbing Wang, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 162 days.

(21) Appl. No.: 13/261,868

(22) PCT Filed: Nov. 9, 2012

(86) PCT No.: PCT/US2012/064370
§ 371 (c)(1),
(2) Date: May 14, 2014

(87) PCT Pub. No.: WO2013/074403
PCT Pub. Date: May 23, 2013

(65) Prior Publication Data
US 2014/0285912 A1    Sep. 25, 2014

Related U.S. Application Data

(60) Provisional application No. 61/559,215, filed on Nov. 14, 2011.

(51) Int. Cl.
*F21V 8/00* (2006.01)
*G02B 5/04* (2006.01)
*G02B 5/30* (2006.01)

(52) U.S. Cl.
CPC *G02B 5/04* (2013.01); *G02B 5/045* (2013.01); *G02B 6/0053* (2013.01); *G02B 5/3083* (2013.01); *G02B 6/0056* (2013.01)

(58) Field of Classification Search
CPC ........ G02B 5/04; G02B 5/045; G02B 5/3083; G02B 6/0053; G02B 6/0056; G02B 6/0036; G02B 27/285; G02B 27/286; G02B 27/28; G02B 5/3025; F21V 5/00; F21V 5/02; F21V 9/14; G02F 2001/133607; G02F 1/133606; G02F 1/133615; G02F 1/13363; G02F 1/133528; G02F 1/13362; G02F 1/133634; H04N 9/3167; H04N 9/3105
USPC ................ 359/831–837, 599, 615, 486.01, 359/486.02, 489.06, 489.07, 489.09; 362/339, 620, 626, 337, 19; 353/81, 20
See application file for complete search history.

(56) References Cited

FOREIGN PATENT DOCUMENTS

EP        1972969        9/2008
WO    WO 2006-110401    10/2006

OTHER PUBLICATIONS

International Search Report for PCT International Application No. PCT/US2012/064370 mailed on May 10, 2013, 5 pages.

*Primary Examiner* — Scott J Sugarman
*Assistant Examiner* — Kristina Deherrera
(74) *Attorney, Agent, or Firm* — Daniel J. Iden

(57) ABSTRACT

A brightness enhancement film includes a plurality of linear prisms disposed on a birefringent substrate. A light ray that enters the film from the substrate side and exits the film from the linear prisms side undergoes substantially a same phase retardation for mutually orthogonal polarization states while travelling within the film. The light ray exits the film at an angle from a normal to the substrate that is greater than 20 degrees.

8 Claims, 14 Drawing Sheets dnxy = 0.03 dnxy = 0.15

APPROACHES TO CONTROL COLOR MURA IN OPTICAL FILMS

TECHNICAL FIELD

Embodiments discussed relate to brightness enhancement recycling films.

BACKGROUND

Flat panel displays are used in a variety of applications ranging from relatively large devices including computer monitors and televisions, to small, handheld devices such as cell telephones, portable DVD players, wristwatches, and gaming devices. Many flat panel displays use optically active materials, such as liquid crystals, and a light source for backlighting the optically active materials. Films disposed between the liquid crystals and a backlight have been used to enhance the brightness of the displays. For example, brightness enhancement films may be used to increase the light exiting at a desired viewing angle with respect to the surface of the display.

SUMMARY

Some embodiments involve a brightness enhancement film having a plurality of linear prisms disposed on a birefringent substrate. A light ray that enters the film from the substrate side and exits the film from the linear prisms side undergoes substantially a same phase retardation for mutually orthogonal polarization states while travelling within the film and exits the film at an angle from a normal to the substrate that is greater than 20 degrees.

Another embodiment involves a brightness enhancement film having a plurality of linear prisms disposed on a substrate and extending along a first direction. The substrate has principal refractive indices $n_x$ and $n_y$ in mutually orthogonal directions in a plane of the substrate, $n_x$ being greater than $n_y$. The first direction makes an angle with a principal direction corresponding to $n_x$ such that a light ray that enters the film from the substrate side and undergoes substantially a same phase retardation for mutually orthogonal polarization states while travelling within the film undergoes total internal reflection by the linear prisms.

Yet another embodiment includes a brightness enhancement film having a plurality of linear prisms disposed on a substrate and extending along a first direction. The substrate has principal refractive indices $n_x$ and $n_y$ in mutually orthogonal directions in a plane of the substrate, $n_x$ being greater than $n_y$ by at least 0.04. The first direction makes an angle with a principal direction corresponding to $n_x$ such that a light ray that enters the film from the substrate side and undergoes a phase retardation difference of less than about 10 degrees for mutually orthogonal polarization states while travelling within the film undergoes reflection by the linear prisms.

The above summary is not intended to describe each embodiment or every implementation. Advantages and attainments, together with a more complete understanding of the various embodiments, will become apparent and appreciated by referring to the following detailed description and claims taken in conjunction with the accompanying drawings.

DETAILED DESCRIPTION

Flat panel displays may use a backlight arranged behind a liquid crystal panel. Many backlights use an edge-lit lightguide light source along with one or more prism films. The prism films collimate the light and thus reduce light that emerges from the display off-axis with respect to the viewing angle. Some brightness enhancement films "recycle" a portion of the light to increase the amount of on-axis exiting from the display. A recycling prism film includes one or more prism film layers that have prism peaks oriented away from the light guide. The prism peaks may be rounded or truncated to achieve particular optical characteristics. As the light from the lightguide encounters the prisms, a portion of the light is refracted in the on-axis direction while another portion of the light is reflected by total internal reflection back toward the light. The reflected light is recycled until it eventually emerges from the display.

Figure 1:
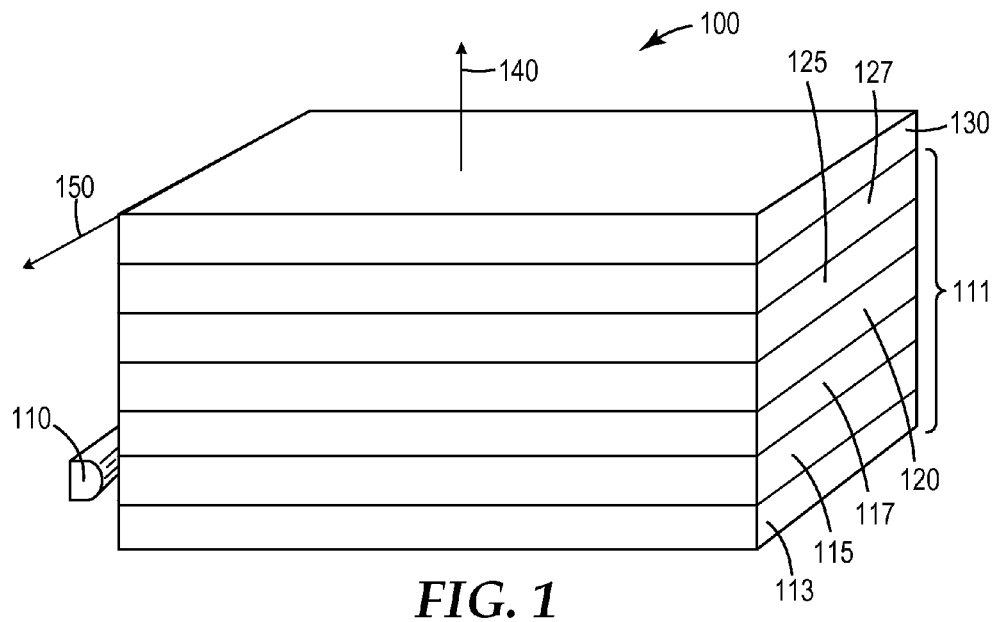
FIG. 1 is a diagram illustrating a liquid crystal display system in accordance with embodiments discussed herein.

FIG. 1 provides a cross sectional diagram of components of a display, such as a liquid crystal display (LCD). The backlight 111 for the display 100 includes a light source 110, a rear reflector 113, a lightguide 115, and a series of light management films 120, 125, 127, to provide spatially and angularly uniform light with the maximum efficiency. More specifically, light exiting a lightguide 115 may travel through a stack of films comprising a diffuser 117, one or more brightness enhancement prism films (BEF) (e.g., light recycling films) 120, a reflective polarizer 125, and, optionally, an additional diffuser cover sheet 127, before entering the display panel 130. For the sake of discussion, we can orient the display 100 with its normal pointing upwards toward the viewer along the direction indicated by arrow 140, and the lightguide edge closest to the light source along a direction referred to as horizontal, along the direction indicated by arrow 150.

Each of the prism films 120 can consist of a clear substrate topped with parallel linear prisms with apex angles that vary depending on the application. In some cases, the prism films are arranged so that the linear prisms of one film generally run in an orthogonal direction to the linear prisms of the other prism film. Such films are said to be in a crossed orientation.

In many backlight systems, the cover sheet is removed to reduce thickness, increase axial brightness, enhance contrast, and/or to reduce cost. One consequence of the removal of the cover sheet, which serves as a diffuser, is that optical artifacts of the backlight elements may become apparent to the viewer looking through the display panel. One such artifact is hereafter referred to as Substrate Color Mura (SCM).

SCM appears as a series of colored bands when a typical prism film is illuminated from under its planar surface and is viewed through the display panel. The bands vary in color with viewing angle, and are the result of the dependence of optical retardation in the prism film substrate on both wavelength and observation angle, and the transmission of these bands through the prisms.

Embodiments described herein involve approaches that reduce the appearance SCM. Prism films that reduce SCM help prevent color shifts of the LCD image, and reduce the objectionable effect of these color shifts changing with observation angle. In various embodiments, prism films can be fabricated that reduce SCM by increasing the substrate birefringence, orienting the prisms with respect to the major stretch direction of the substrate, or both.

Figure 2:
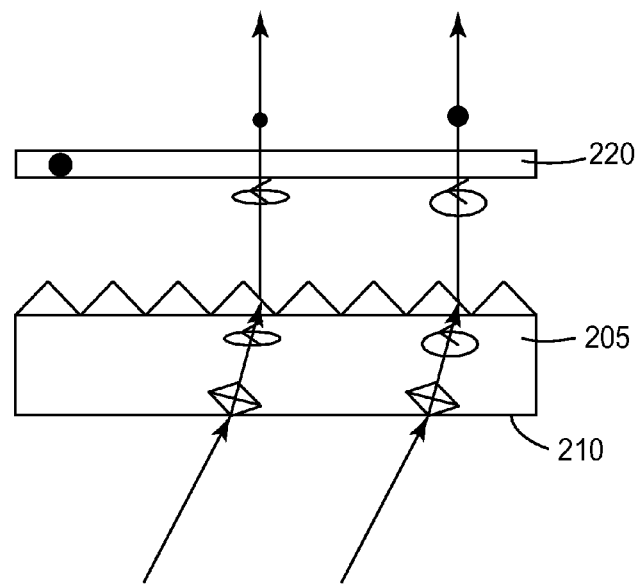
FIG. 2 is a block diagram that illustrates the mechanism that produces substrate color mura (SCM)

The mechanism for SCM is described with reference to FIG. 2. Light enters the lower planar side 210 of the prism film substrate 205, and is partially polarized in transmission at the air/substrate interface. The polarization state of the transmitted light after partial polarization at the air/substrate interface is a combination of unpolarized input and linearly polarized light. In traversing the substrate 205, the phase difference between the electric field components vibrating in the plane of incidence (p-polarization) and that vibrating perpendicular to the plane of incidence (s-polarization) varies along the ray path. This in turn causes the electric field to trace an ellipse as the ray propagates, giving rise to elliptical polarization. The phase difference (symbolized by R) is a function of the refractive index difference Δn between the s and p components (which depends on wavelength λ and ray angle in the film), and the internal path length d (which depends on the ray angle in the film):

$$R = \frac{2\pi \Delta n(\theta, \phi, \lambda) d(\theta, \phi)}{\lambda}$$

Here the ray angle is defined by θ and φ, where θ is the polar angle measured from the film normal axis and φ, is the azimuthal angle measured in the film plane.

As a result of the dependencies of R on wavelength and ray angle, the ratio of the s and p components after traversing the substrate will also depend on these parameters. Once the ray passes through the lower absorbing polarizer 220 of the display panel, the transmitted luminance will therefore also depend on these parameters. The result can be SCM, which appears as a series of weak colored band features that vary in color and brightness with viewing angle.

Figure 3A:
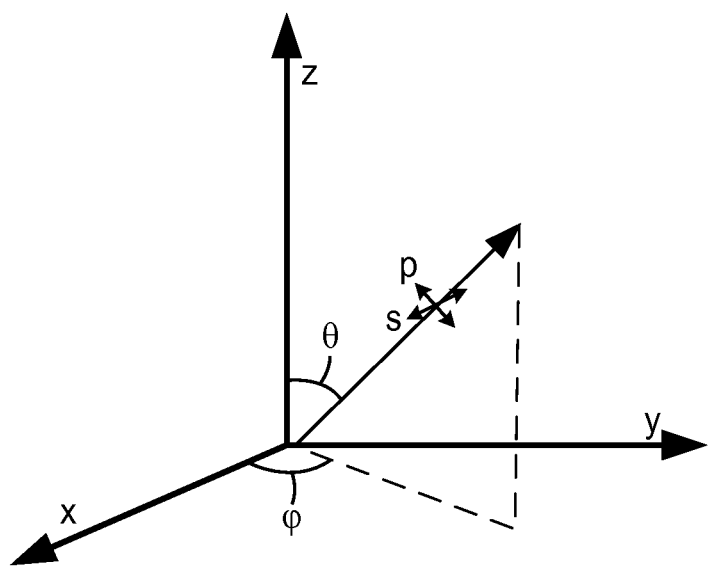
FIG. 3A illustrates the relationship between the x, y, z axes of a prism film and the s and p directions of a light ray.
Figure 3B:
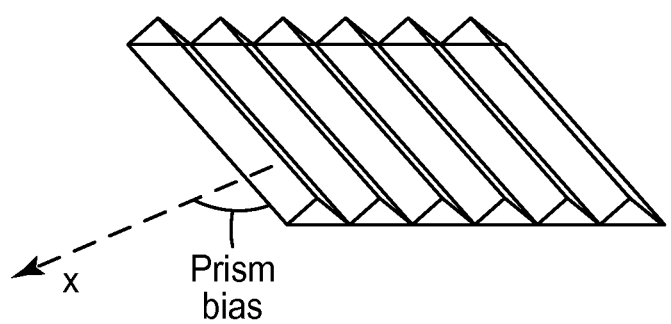
FIG. 3B illustrates the azimuthal bias angle of a prism film.

One way to assign principle axes to a prism film made in a continuous fashion, as in the case of a film web, is to refer to the plane of the film as the xy plane, and designate the direction normal to the film as z. If light is linearly polarized along these mutually orthogonal directions, one can determine the corresponding refractive indices, and refer to these as $n_x$, $n_y$, and $n_z$. For the purposes of discussion, but not limited to this particular situation, let $n_y > n_x > n_z$. For $n_y > n_x$, the x direction may be referred to as the film Fast Axis (FA), and y as the film Slow Axis. Note that local values of $n_x$ and $n_y$ may vary depending on position in the film, thus the direction of the x (fast) and y (slow) axes may change at different positions on the film, depending on the local refractive indices. The in-plane index difference is denoted $dn_{xy} = n_y - n_x$. The relationship between the x, y, z axes of the film, and the s and p directions of the light ray are illustrated in FIG. 3A, with the azimuthal bias angle of the prism shown in FIG. 3B. The prisms of the prism film alter the angle of the rays exiting the prism film substrate, in some cases bringing the SCM band features within a near axial viewing range.

Figure 4:
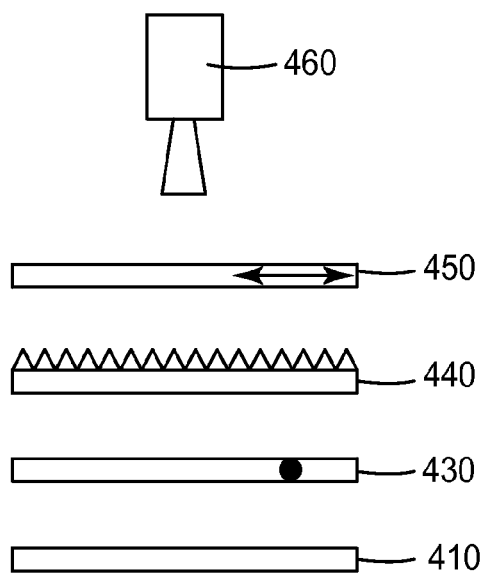
FIG. 4 is a block diagram illustrating a test setup for measuring enhanced SCM.

For the purposes of analysis and detection it is sometimes useful to enhance the contrast of the SCM bands. One method of enhancing SCM is illustrated in FIG. 4. The light from the light source 410 is pre-polarized using an absorbing polarizer 430 placed between the light source 410 and the prism film 440. The pass axis of the absorbing polarizer is perpendicular to a polarizer 450 placed above the prism film 440, with the orthogonal pass axes indicated by the symbols • and ⇋. Using this configuration, observations can be made of SCM band features using imaging optics 460 which provide a conoscopic view of the light emerging from polarizer 450. Each position on a conoscopic image is associated with polar (θ) and azimuthal (φ) observation angles.

Figure 5:
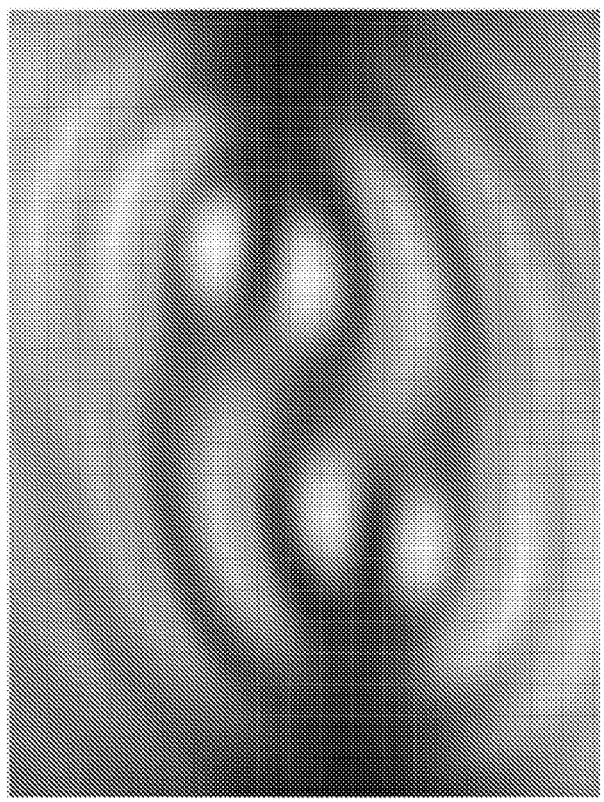
FIG. 5 is a conoscopic view of enhanced SCM.

This method of observing light emerging from a prism film disposed between two crossed polarizers is hereafter referred to as prism film between crossed polarizers or enhanced SCM. Observations have shown that the SCM features are very similar with and without the lower polarizer 430, but the contrast using the enhanced SCM method is greatly enhanced by using the lower polarizer 430. A grey scale image of the SCM color bands produced by the enhanced SCM approach is shown in FIG. 5, where a light source with a broad angle distribution was used to illuminate a prism film between crossed polarizers. The imaging optics 460 provides a conoscopic view over approximately a 20° viewing cone along the short dimension of the image shown in FIG. 5.

Figure 6A:
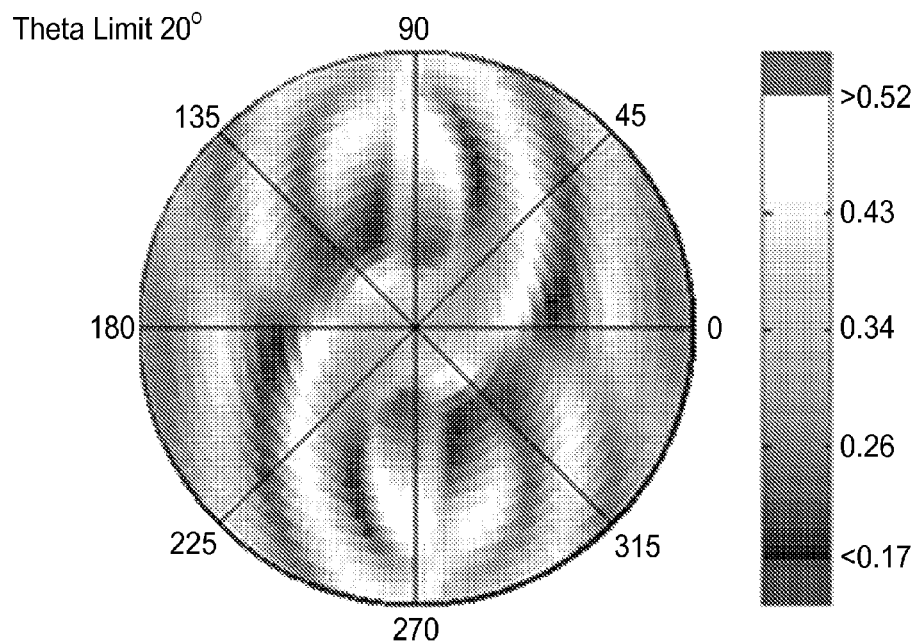
FIGS. 6A and 6B are simulated representations of the x and y color values, respectively, at each viewing angle for a prism film between crossed polarizers spanning a viewing angle of 20°.
Figure 6B:
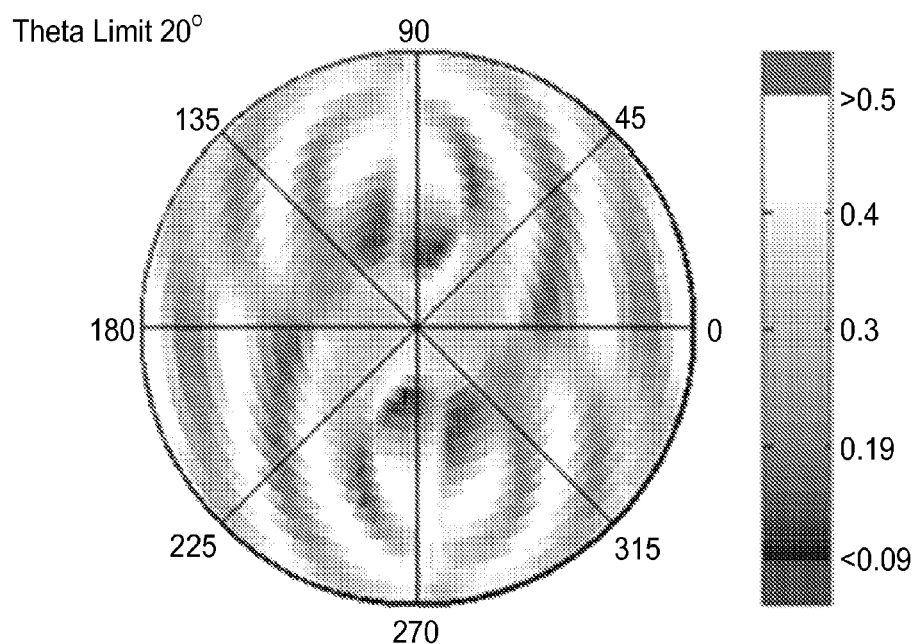

The SCM effect may be quantified as the variation of color within a specified viewing cone. One measure of color is the International Commission on Illumination (CIE) 1931 color coordinates, x and y. Simulated representations of the x and y color values at each viewing angle for a prism film between crossed polarizers are shown in FIGS. 6A and 6B, respectively, spanning a viewing angle of 20°. In this example, the prisms have a 90 degree apex angle, oriented 10 degrees to the top polarizer direction, with a 52 μm thick birefringent substrate.

One measure of SCM is given by the quadrature sum of the standard deviation, σ, of the x and y color coordinates within this viewing range, which can be calculated as:

$$\sigma_{SCM} = \sqrt{\sigma_x^2 + \sigma_y^2}.$$

The images of prism films examined between crossed polarizers can be converted from bitmaps, where each pixel is characterized by RGB values, into color x and y coordinates by a suitable matrix transformation. The above definition may then be applied to the image as a measure of SCM. The transformation is given by the equations below. The r, g, b values are the RGB color coordinates. The quantities $\bar{x}$, $\bar{y}$, and $\bar{z}$ are the CIE 1931 two degree color matching functions, and R, G, B are the spectra of the image in the pure red, green, or blue states, respectively.

$$\begin{pmatrix} X \\ Y \\ Z \end{pmatrix} = A \begin{pmatrix} r \\ g \\ b \end{pmatrix}$$

$$A = \frac{100}{\Sigma_\lambda \bar{y}_\lambda} \sum_\lambda \begin{pmatrix} R_\lambda \bar{x}_\lambda & G_\lambda \bar{x}_\lambda & B_\lambda \bar{x}_\lambda \\ R_\lambda \bar{y}_\lambda & G_\lambda \bar{y}_\lambda & B_\lambda \bar{y}_\lambda \\ R_\lambda \bar{z}_\lambda & G_\lambda \bar{z}_\lambda & B_\lambda \bar{z}_\lambda \end{pmatrix}$$

$$x = \frac{X}{X+Y+Z}$$

$$y = \frac{Y}{X+Y+Z}$$

Another measure of SCM quantifies the rate of variation of the x and y color coordinates with angle. One example is to fix the azimuthal angle ($\phi$) and to sum the derivative of x and y with respect to the polar angle ($\theta$) in quadrature fashion:

$$D_{SCM}(\varphi) = \sum_{\theta=-\theta_0}^{\theta_0} \sqrt{\left(\frac{\partial x}{\partial \theta}\right)^2 + \left(\frac{\partial y}{\partial \theta}\right)^2}$$

To determine a metric for all angles using the angle derivatives, the value of $D_{SCM}$ can be summed over azimuthal angles from 0 to 180 degrees. Alternatively, the maximum value of $D_{SCM}$ over all azimuthal angles can be used. Simulations show that the results using $D_{SCM}$ are similar to using $\sigma_{SCM}$ multiplied by the average angle frequency of the bands.

The metric $\sigma_{SCM}$, calculated over a polar angle range of 20 degrees centered on the normal axis, will be used for the purposes of this discussion.

In some cases, SCM is reduced through control of the prism film substrate birefringence. The magnitude of SCM will depend on R as well as the prism geometry and prism refractive index. A reduction in R, resulting from a decrease in $\Delta n$, d or both, leads to reduced contrast of the color bands, or an increase in their angular extent beyond the viewing cone, both of which reduces SCM. However, the production of prism film on very thin substrates, providing decreased values of d, leads to reduced yields due to handling issues. Thin films may also easily deform with varying temperature and humidity, leading to visual artifacts.

The production of low birefringence substrates (decreased $dn_{xy}$) can be achieved using polymers with low intrinsic optical anisotropy, such as polycarbonate or poly methyl-methacrylate, but such materials tend to either be high cost or too brittle to provide robust films. Alternatively, a polymer with higher intrinsic anisotropy such as polyethylene terephthalate (PET) may be used, where a biaxial stretching process can minimize the difference between the refractive indices along the principle film axes. However, this method of film formation can increase production costs.

Figure 7A:
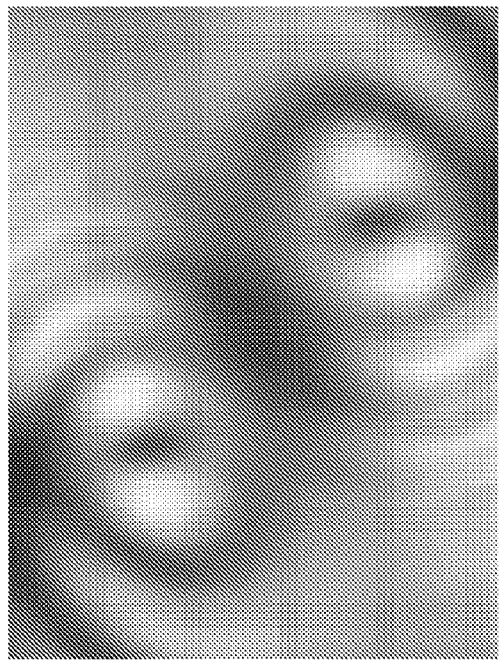
FIG. 7A shows the SCM image of a prism film having a $dn_{xy}$ of 0.03 viewed between crossed polarizers.
Figure 7B:
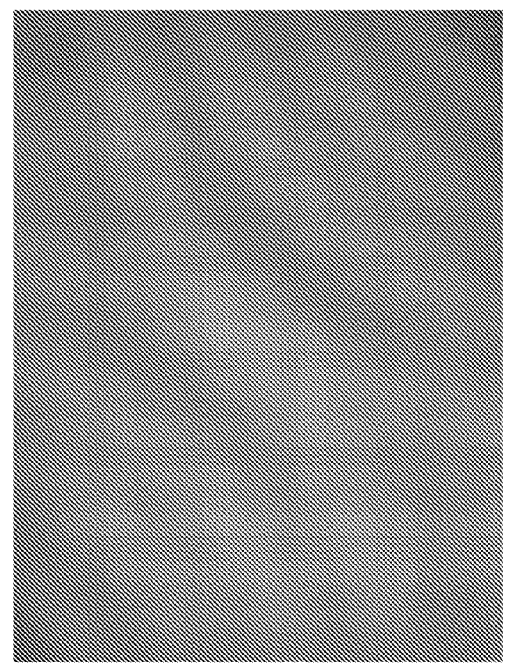
FIG. 7B shows the SCM image of a prism film of substantially the same construction as the film of FIG. 7A but with a $dn_{xy}$ of 0.15.

Surprisingly, as discussed in more detail below, an increase in $dn_{xy}$ can also be successful in significantly reducing SCM. An example of the reduction of SCM utilizing high $dn_{xy}$ is shown by FIGS. 7A and B. FIG. 7A shows the SCM of a prism film comprising a 50 μm thick PET substrate and a $dn_{xy}$ of 0.03 viewed between crossed polarizers (prisms are oriented at 45 degrees to the top polarizer pass axis, which is in the horizontal direction). FIG. 7B shows the SCM of a prism film of substantially the same construction as the film of FIG. 7A (PET substrates 50 μm thick were used, with prisms oriented at 45 degrees to the top polarizer pass axis, with the pass axis along the horizontal direction, and the prism films are viewed between crossed polarizers) except that the film of FIG. 7B has a $dn_{xy}$ of 0.15. For the larger $dn_{xy}$ case, the SCM color bands that occur within the 20° azimuthal viewing cone are far less distinct. In an actual display, the lower polarizer would be absent, and the SCM effect would be substantially invisible to a viewer for the high $dn_{xy}$ case.

Figure 8:
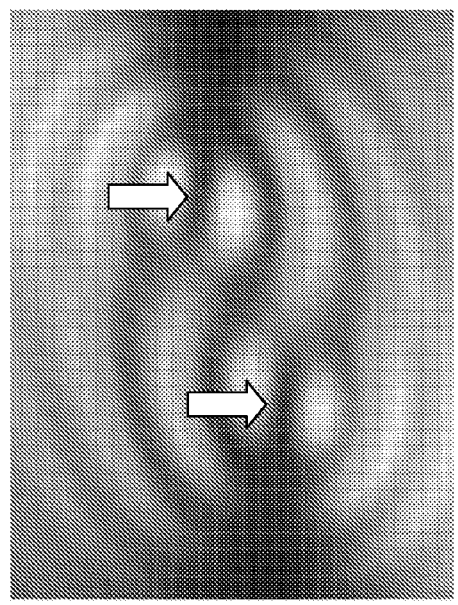
FIG. 8 illustrates symmetry point (SP) angles for SCM.

One of the features of the SCM pattern is the pair of somewhat circular regions, as indicated by arrows in the conoscopic view of FIG. 8, where the rate of change of color with angle and the contrast of the color bands is particularly acute. These angles are hereafter referred to as Symmetry Points (SP), which originate from rays within the substrate that experience equal refractive indices for s and p polarization components (zero birefringence). The SPs are a function of the substrate refractive indices (typically measured along the principle axes of the film), the refractive index of the prisms, and the prism apex angle. For linear prisms there is also a dependence on the azimuthal angle of the prism direction relative to the substrate principle axis in the film plane.

The SP angle can be increased by increasing the in-plane birefringence $dn_{xy}$. The SP angle is independent of the substrate thickness, because $\Delta n=0$ creates $R=0$ at any thickness (however, the color bands tend to vary more rapidly with angle in thicker substrates). An increase in the SP angle beyond the observation cone, for example, beyond an observation cone of 20 degrees, reduces the fluctuation of color within the view cone, and reduces SCM. Thicker substrates create a band pattern near the SP angle that diminishes in contrast more rapidly with angle than thinner substrates. As a result, thicker substrates generally require less $dn_{xy}$ to reduce SCM.

Figure 9A:
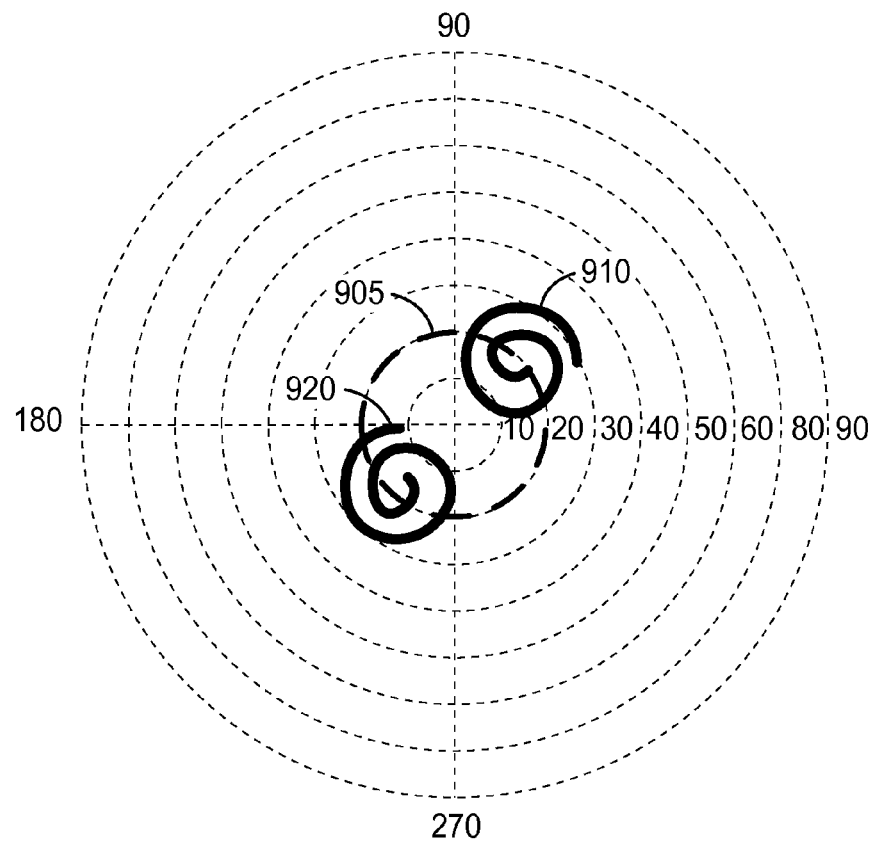
FIGS. 9A and 9B illustrate movement of the SP angles beyond a viewing cone.
Figure 9B:
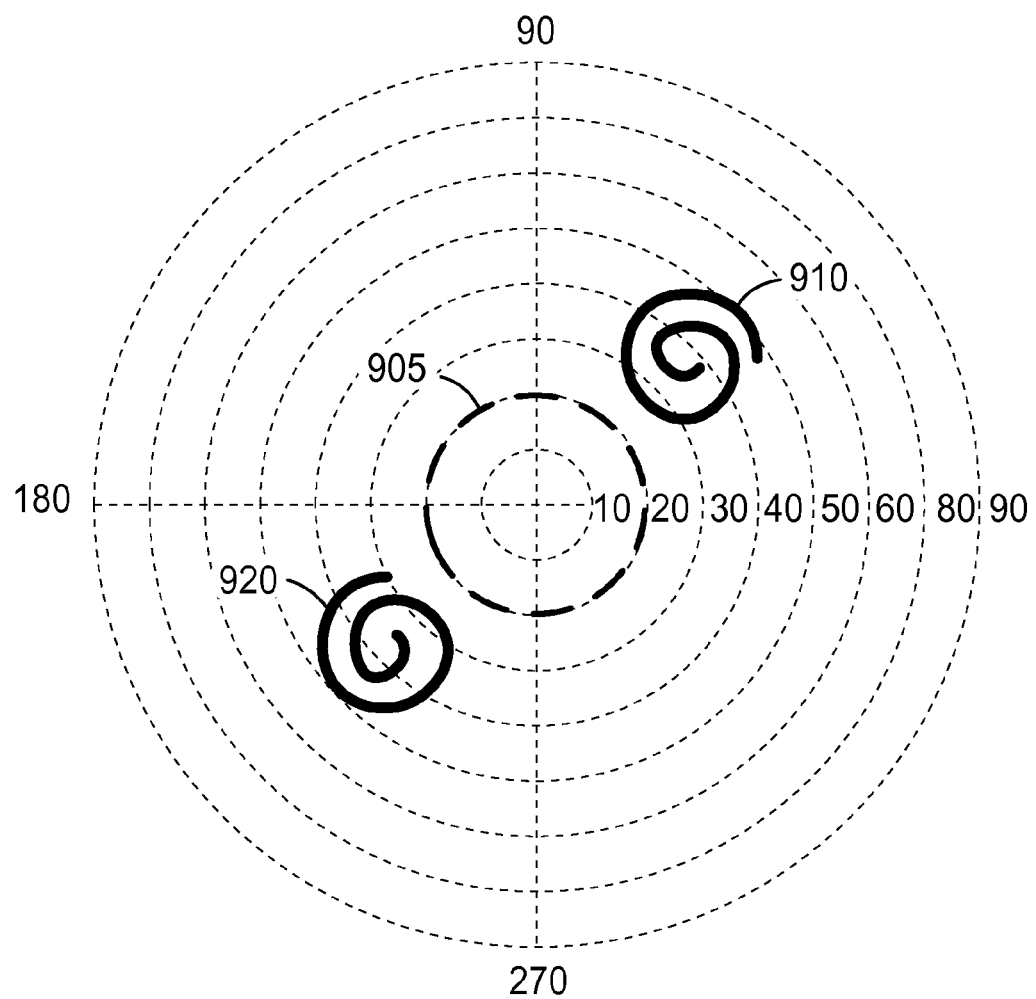

Substrate materials such as PET may be stretched to increase $dn_{xy}$ sufficiently so that the SP angles move beyond a viewing cone. Increasing the SP angle with increasing $dn_{xy}$, in this case by film stretching, may be appreciated with reference to FIGS. 9A and 9B. FIG. 9A represents an SCM image of a film having $dn_{xy1}$ and having SP angles as indicated by swirls 910, 920. The SP angles are substantially within the viewing cone angle 905, which in this case is the cone bounded by the polar angle 20°. After the film is stretched, the $dn_{xy}$ of the film has increased to $dn_{xy2} > dn_{xy1}$. FIG. 9B illustrates the SP angle of the film after stretching, showing that the SP angle indicated by swirls 930, 940 has moved outside the viewing cone 905, due to the increase in $dn_{xy}$.

In some embodiments, for a prism film, e.g., comprising PET, having linear prisms disposed on a birefringent substrate, a light ray enters from the substrate side of the film and exits at the prism side of the film. At the SP angles, the light ray undergoes substantially the same phase retardation for mutually orthogonal s and p polarization states while travelling within the film. The light ray exits the film at an angle from a normal to the substrate that is greater than a viewing cone, e.g. a viewing cone of 20 degrees. Moving the SP angle beyond the viewing cone substantially reduces the observable SCM. For example, the birefringence of the substrate may be in a range from about 0.02 to about 0.1. In various embodiments, the birefringence of the substrate may be 0.02, 0.04, 0.06, 0.08, or 0.1. Substantially the same phase retardation may involve a difference in phase retardation of the s and p polarization states of less than about 10 degrees for example. In various configurations, the apex angle of the linear prisms may be about 90°, may be in a range of about 80° to about 110° or may be in a range of about 85° to about 105°.

Figure 10A:
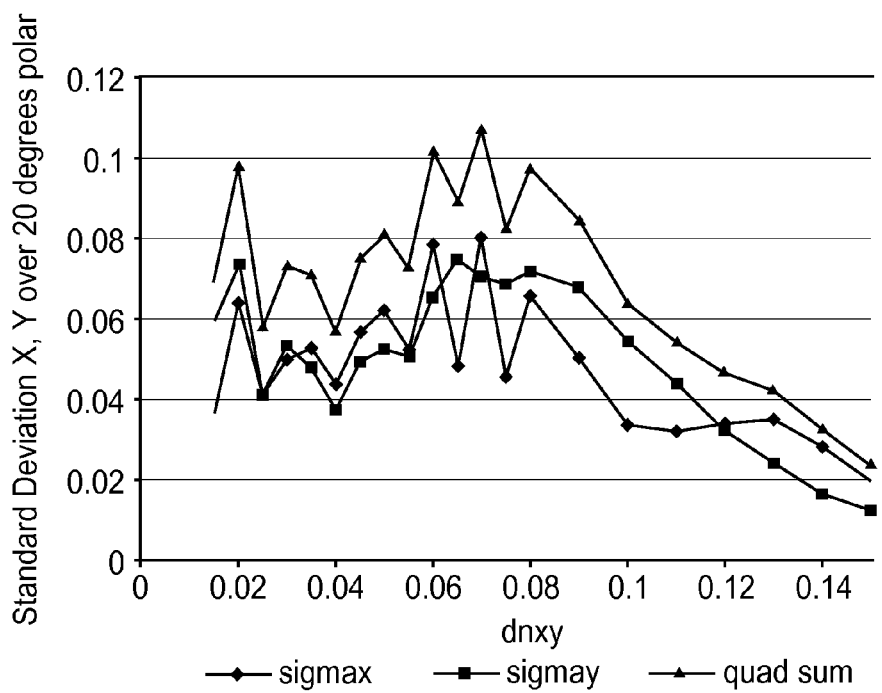
FIGS. 10A, 10B, and 10C show simulations of standard deviation $\sigma_x$ (sigmax), $\sigma_y$ (sigmay), of the x and y color coordinates, respectively, and the quadrature sum, $\sigma_{SCM}$ (quad sum), as a function of $dn_{xy}$ for prism films of varying substrate thicknesses.
Figure 10B:
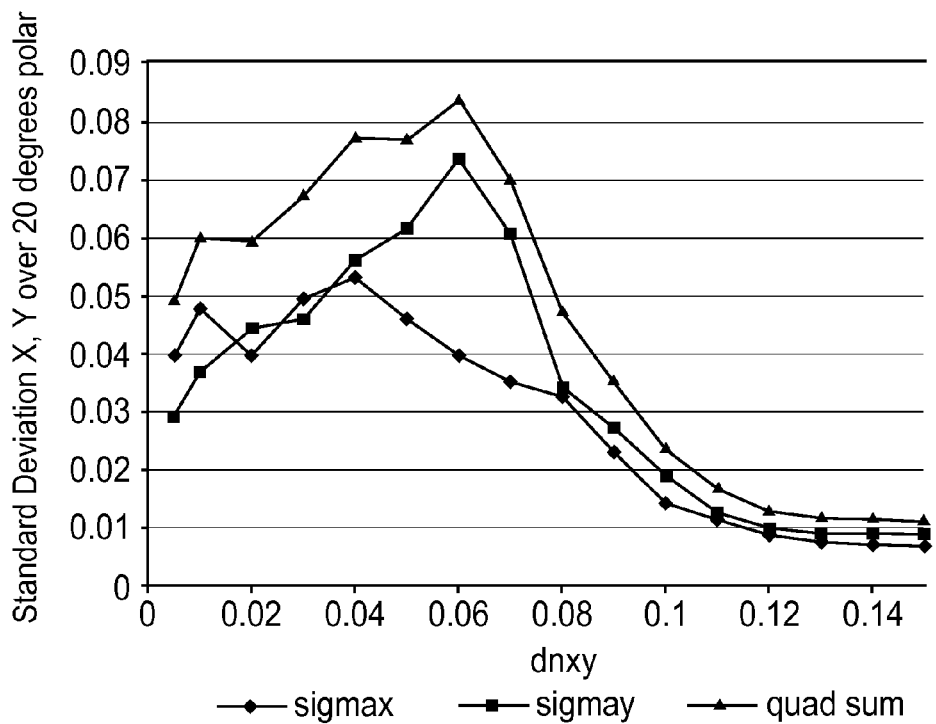
Figure 10C:
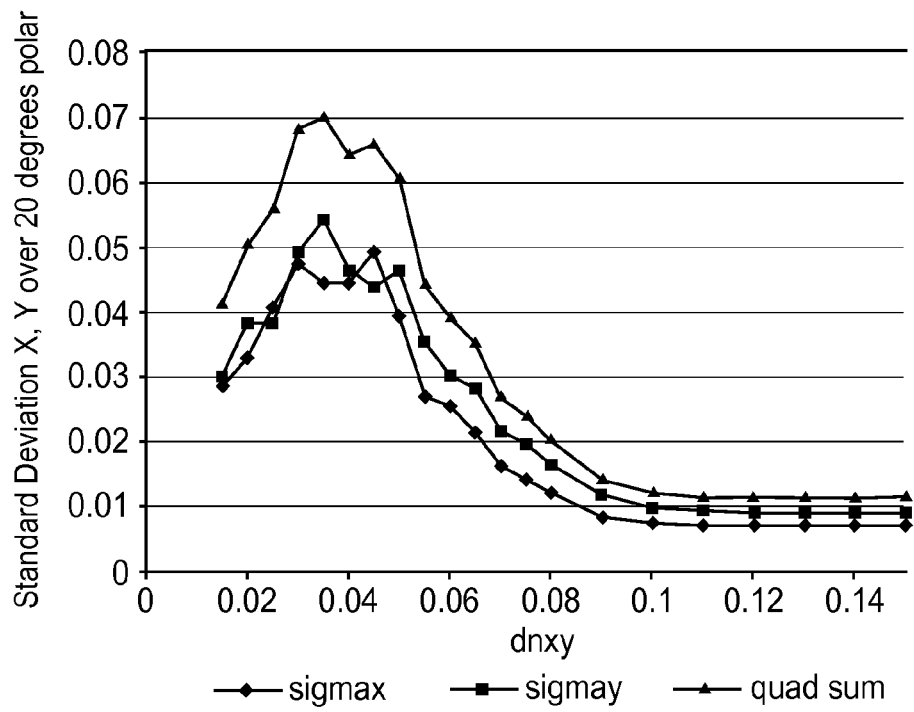

FIGS. 10A, 10B, 10C show plots of the standard deviation $\sigma_x$, $\sigma_y$ of the x and y color coordinates, respectively, and the quadrature sum, $\sigma_{SCM}$ as a function of $dn_{xy}$ for simulated prism films. These values were numerically simulated for birefringent substrates of thickness 25 µm, 52 µm, and 104 µm, respectively, with FA=0 degrees relative to the prism direction. In these simulations, the prisms were given a 90 degree apex angle, index of 1.6, and were set to a 45 degree azimuthal angle relative to the top polarizer.

Figure 11:
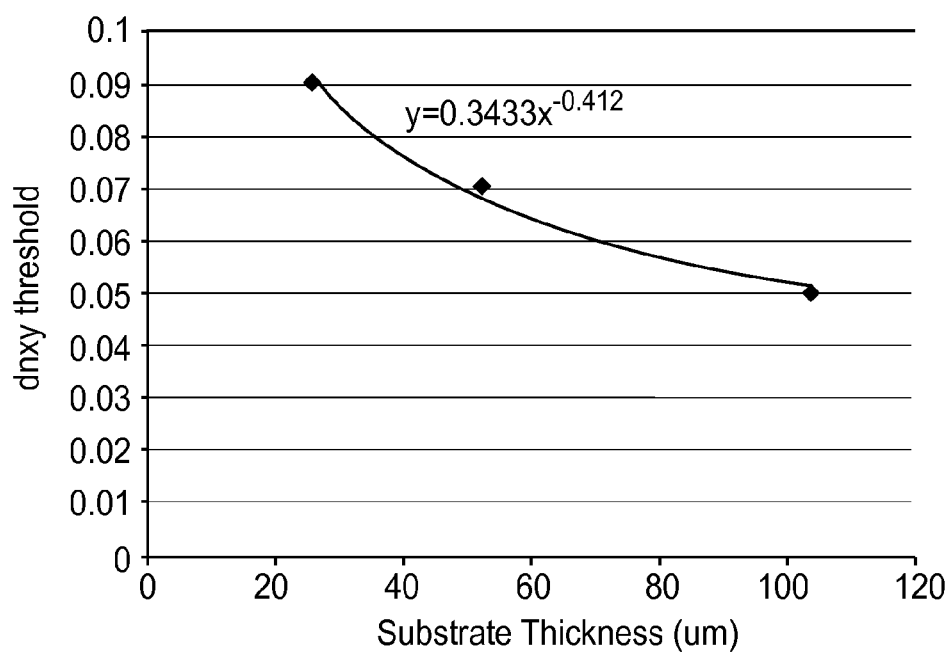
FIG. 11 is a plot showing the variation of $dn_{xy}$ threshold with substrate thickness.

In the simulations illustrated in FIGS. 10A, 10B, 10C, each substrate thickness demonstrates that $\sigma_{SCM}$ increases or remains high until $dn_{xy}$ reaches a threshold after which $\sigma_{SCM}$ begins to decrease, corresponding to the birefringence level at which the color variations centered at the SP substantially exits the viewing cone. These thresholds are plotted in FIG. 11, and show that higher substrate thickness lowers the $dn_{xy}$ threshold approximately as the inverse square root of the thickness. This is a consequence of extent of the color variations surrounding the SP being larger for thinner substrates, requiring that the SP angle be located to larger angles for color variations to be outside the viewing cone.

Figure 12A:
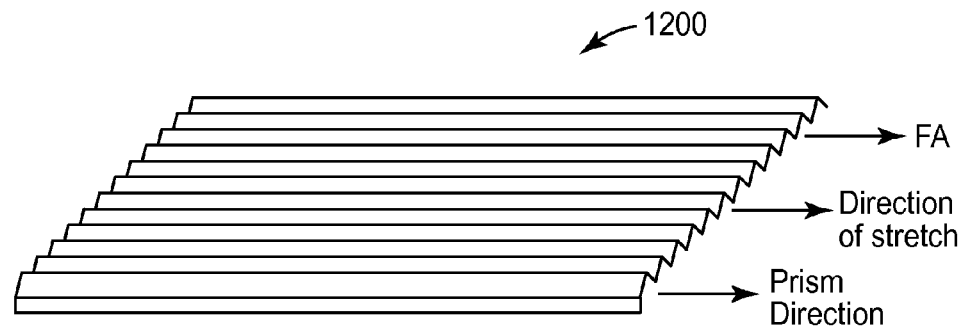
FIGS. 12A and 13A illustrate a prism films having prisms oriented at 0° with respect to the substrate FA and 90° with respect to the substrate FA, respectively.
Figure 12B:
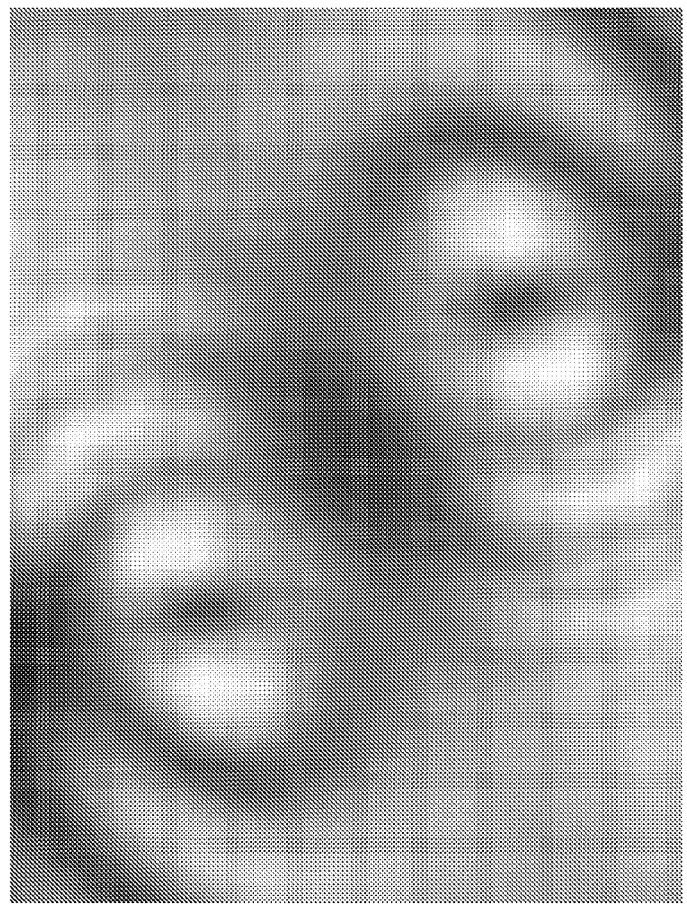
FIGS. 12B and 13B show the SP angles for the prism films of FIGS. 12A and 13A, respectively.
Figure 13A:
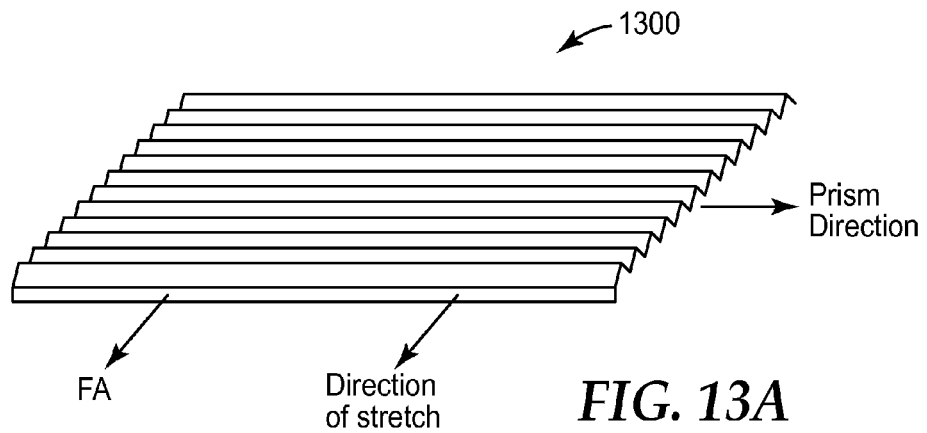
Figure 13B:
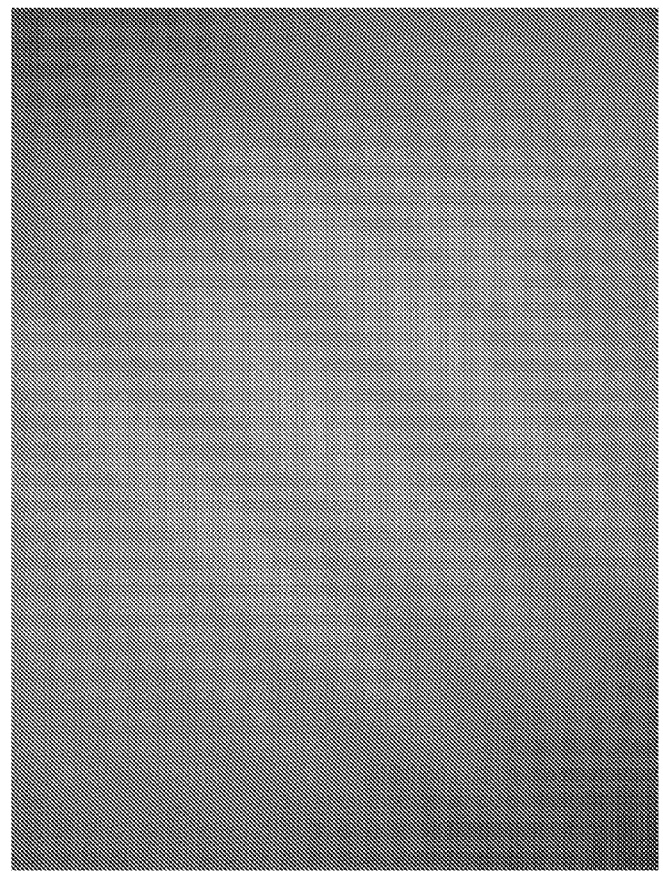

An alternative or additional approach that may be used to reduce SCM in a display incorporating prism films is to orient the prisms of the prism film at angles substantially perpendicular to the prism substrate FA. FIGS. 12A and 13A illustrate a prism films 1200, 1300 with prisms oriented at 0° with respect to the substrate FA and 90° with respect to the substrate FA, respectively. For each of the films, 1200, 1300, the substrate FA substantially corresponds to the direction that the substrate is stretched. The images depicted in FIGS. 12B and 13B are optical images of prism films 1200, 1300, respectively, placed between crossed polarizers. These images show the effect on SCM due to orienting the FA (and direction of substrate stretching) of the substrate perpendicular to the prisms. The prisms and substrate of prism films 1200 and 1300 are similar in all aspects except the FA orientation relative to the prism direction. In both cases, prism films are at 45 degrees to the top polarizer pass direction, which is horizontal. It is evident that SCM bands are much reduced in contrast in prism film 1300 which has the substrate FA oriented perpendicular to the prisms.

Some embodiments are directed to brightness enhancement films comprising a plurality of linear prisms disposed on a substrate and extending along a prism direction. The substrate has principal refractive indices $n_x$ and $n_y$ in mutually orthogonal directions in a plane of the substrate, $n_x$ being greater than $n_y$. The prism direction makes an angle with a principal direction corresponding to $n_x$, the principal direction being the FA of the substrate. A light ray that enters the film from the substrate side and undergoes substantially a same phase retardation for the mutually orthogonal polarization states while travelling within the film undergoes total internal reflection by the linear prisms. For example, the prism direction may make an angle with the FA that is less than 20 degrees, or less than 15 degrees, or less than 10 degrees. In some cases, $n_x$ may be greater than $n_y$ by at least 0.02 and in some cases, $n_x$ may be greater than $n_y$ by at least 0.04. The phase retardation difference may be of less about 10 degrees for the mutually orthogonal polarization states.

Prisms may be oriented at angles near perpendicular to the substrate FA by a cast and cure replication method where the mold forming the prisms is oriented at the desired angle to the substrate. This can be accomplished in a continuous manufacturing process if the FA is essentially along the long direction of the substrate (typically the case for films stretched primarily across the film width), by utilizing a cylindrical mold whose prism features run substantially across the width of the substrate. Alternatively, the FA can be oriented across the width by elongating the substrate along the long dimension, followed by replication of prisms in approximately the same direction using a cylindrical mold whose prism features run essentially along its circumference.

Figure 14:
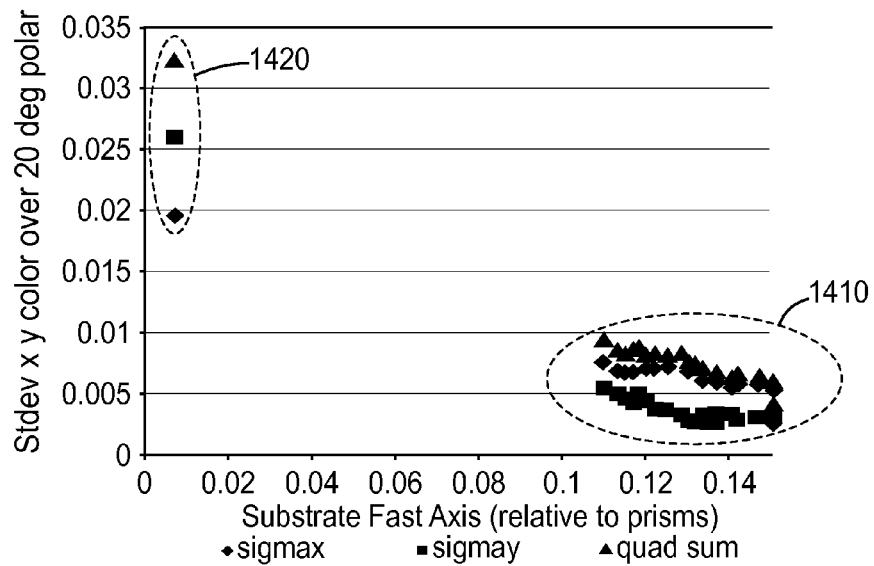
FIGS. 14 and 15 are simulations showing $\sigma_x$ (sigmax), $\sigma_y$ (sigmay), and $\sigma_{SCM}$ (quad sum) vs. angle of the prism film substrate fast axis with respect to the prism axis.

As an example, a prism films with reduced SCM were produced using micro-replication of a UV cured resin onto a PET substrate, where the resulting prisms formed an angle relative to the substrate FA spanning 65 degrees to 90 degrees. A separate film sample with FA near parallel to the prisms was also measured (prisms formed an angle relative to the substrate FA of approximately 0 degrees). Conoscopic images were obtained of the film between crossed polarizers, and the standard deviation of the x and y color coordinates of the images were calculated. The results are shown in FIG. 14, demonstrating a significant drop in the standard deviations of x and y at high FA. Data ($\sigma_x$ (sigmax), $\sigma_y$ (sigmay), and $\sigma_{SCM}$ (quad sum)) for the film having prisms oriented from about 65 degrees to about 90 degrees to the FA are shown in oval 1410 of FIG. 14. Data for the film having FA about parallel to the prisms is shown in oval 1420.

Figure 15:
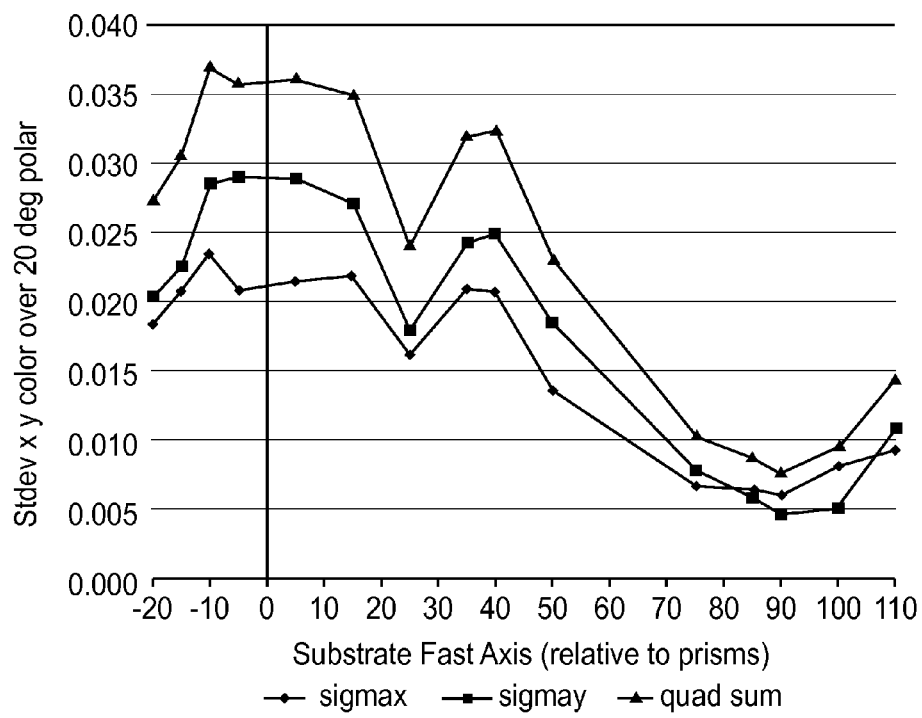

In another example, prisms were replicated onto a 50 um thick PET substrate over a wide range of angles relative to the substrate FA, and images of the prism film between crossed polarizers were used to calculate the standard deviation of x and y color coordinates. The results, shown in FIG. 15, confirm the reduction of SCM when the FA is within a range of perpendicular to the substrate FA, e.g., between about 75 and 110 degrees. Visual observation of the prism film under a polarizer, without a bottom polarizer, shows acceptable SCM levels.

The SP angles are generally along the direction perpendicular to the substrate FA. When the FA is substantially parallel to the prism direction, rays at the SP angle are refracted by the prisms toward the axial direction, within the axial viewing cone, making SCM visible to the viewer. For prisms oriented near perpendicular to the FA, rays exiting at angles near the SP have reduced transmission through the prisms due to internal reflection.

Figure 16A:
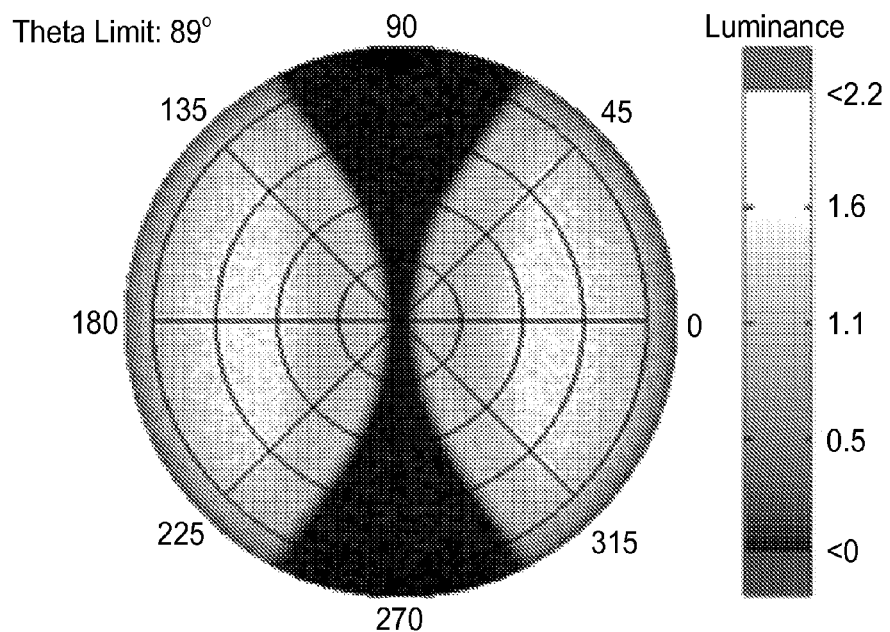
FIGS. 16A and 16B show regions corresponding to the range of polar and azimuthal angles which will be predominately reflected by the 90 degree apex angle prisms for substrate refractive indices of 1.5 and 1.6, respectively.
Figure 16B:
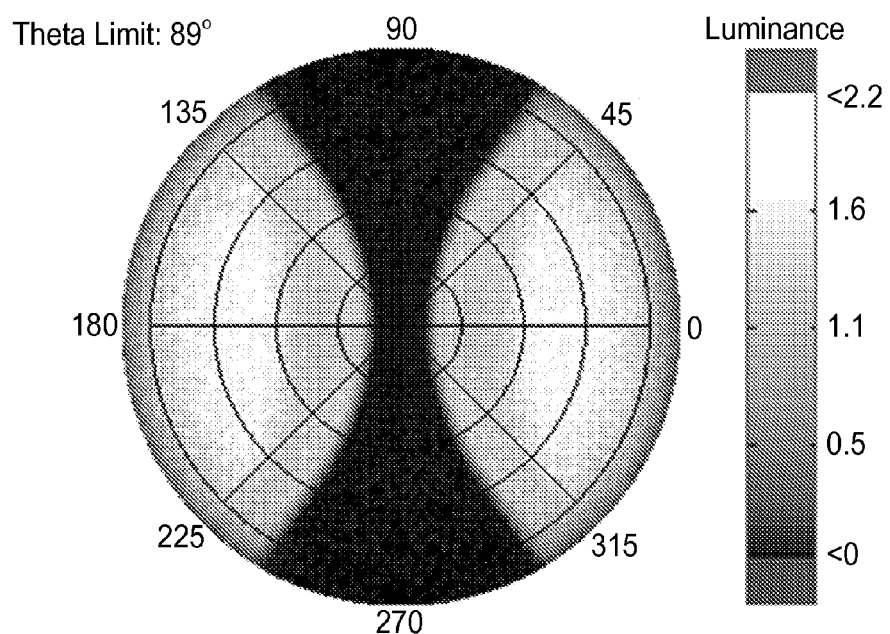

There is a range of polar and azimuthal angles which will be predominately reflected by the prisms. The angular extent of this range is a function of the prism refractive index and apex angle. The conoscopic plots of FIGS. 16A and 16B show this region corresponding to the range of polar and azimuthal angles which will be predominately reflected by the prisms as a dark band for prisms with a 90 degree apex angle and a refractive index of 1.5 and 1.6, respectively. As is evident from the plots, higher prism refractive index broadens the reflection angle range, providing higher azimuthal angle tolerance for the FA to reduce SCM.

Figure 17:
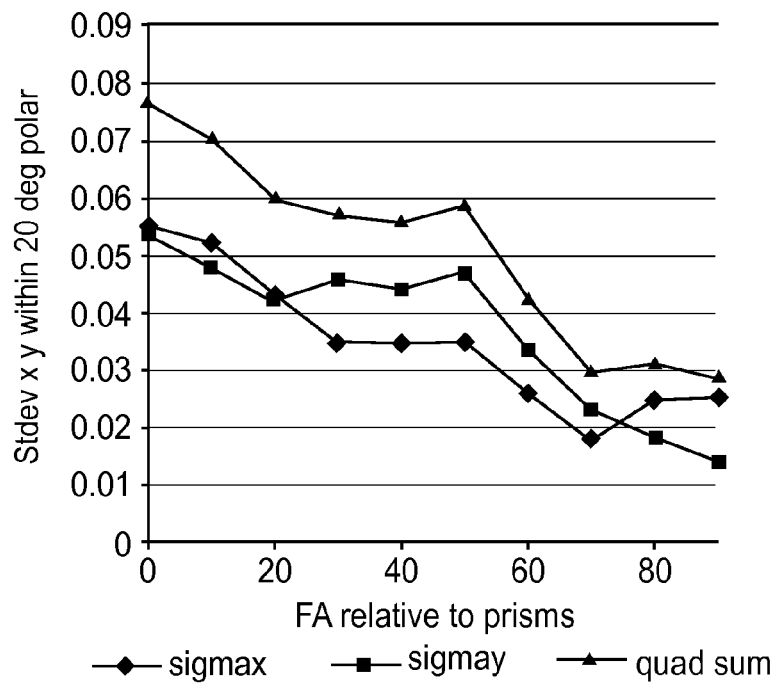
FIGS. 17 and 18 show $\sigma_x$ (sigmax), $\sigma_y$ (sigmay), and $\sigma_{SCM}$ (quad sum) vs. the angle of FA relative to the prism axis for simulated prism films having $dn_{xy}$=0.035 and substrate thickness of 52 μm and 104 μm, respectively.
Figure 18:
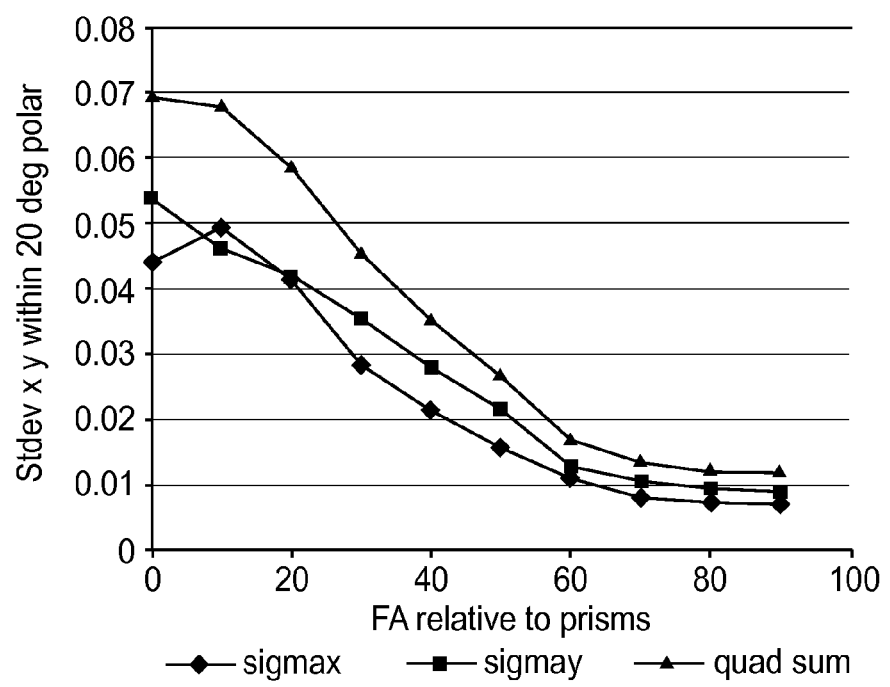

Enhanced SCM was simulated as a function of the angle between the FA and prism direction. Data ($\sigma_x$ (sigmax), $\sigma_y$ (sigmay), and $\sigma_{SCM}$ (quad sum)) are shown for the case of $dn_{xy}$=0.035 for substrate thickness of 52 µm and 104 µm in FIG. 17 and FIG. 18, respectively. The results are in reasonable agreement with the measured dependence of SCM on FA angle Thinner substrates with the same $dn_{xy}$ require larger FA angles to significantly reduce SCM.

Item 1. A brightness enhancement film comprising:
a plurality of linear prisms disposed on a birefringent substrate, such that a light ray that enters the film from the substrate side and exits the film from the linear prisms side and undergoes substantially a same phase retardation for mutually orthogonal polarization states while travelling within the film, exits the film at an angle from a normal to the substrate that is greater than 20 degrees.

Item 2. The brightness enhancement film of item 1, wherein the substrate birefringence in a plane of the substrate is at least 0.02.

Item 3. The brightness enhancement film of item 1, wherein the substrate birefringence in a plane of the substrate is at least 0.04.

Item 4. The brightness enhancement film of item 1, wherein the substrate birefringence in a plane of the substrate is at least 0.06.

Item 5. The brightness enhancement film of item 1, wherein the substrate birefringence in a plane of the substrate is at least 0.08.

Item 6. The brightness enhancement film of item 1, wherein the substrate birefringence in a plane of the substrate is at least 0.1.

Item 7. The brightness enhancement film of item 1, wherein the substrate comprises PET.

Item 8. The brightness enhancement film of item 1, wherein a difference between the phase retardations for the mutually orthogonal polarization states is less than about 10 degrees.

Item 9. The brightness enhancement film of item 1, wherein the linear prisms have peak angles in the range from 80 to 110 degrees.

Item 10. The brightness enhancement film of item 1, wherein the linear prisms have peak angles in the range from 85 to 105 degrees.

Item 11. The brightness enhancement film of item 1, wherein the linear prisms have 90 degree peak angles.

Item 12. A brightness enhancement film comprising:
a plurality of linear prisms disposed on a substrate and extending along a first direction, the substrate having principal refractive indices $n_x$ and $n_y$ in mutually orthogonal directions in a plane of the substrate, $n_x$ being greater than $n_y$, wherein the first direction makes an angle with a principal direction corresponding to $n_x$ such that a light ray that enters the film from the substrate side and undergoes substantially a same phase retardation for mutually orthogonal polarization states while travelling within the film undergoes reflection by the linear prisms.

Item 13. The brightness enhancement film of item 12, wherein the first direction makes an angle with a principal direction corresponding to $n_x$ that is less than 20 degrees.

Item 14. The brightness enhancement film of item 12, wherein the first direction makes an angle with a principal direction corresponding to $n_x$ that is less than 15 degrees.

Item 15. The brightness enhancement film of item 12, wherein the first direction makes an angle with a principal direction corresponding to $n_x$ that is less than 10 degrees.

Item 16. The brightness enhancement film of item 12, wherein $n_x$ is greater than $n_y$ by at least 0.02.

Item 17. A brightness enhancement film comprising:
a plurality of linear prisms disposed on a substrate and extending along a first direction, the substrate having principal refractive indices $n_x$ and $n_y$ in mutually orthogonal directions in a plane of the substrate, $n_x$ being greater than $n_y$ by at least 0.04, wherein the first direction makes an angle with a principal direction corresponding to $n_x$ such that a light ray that enters the film from the substrate side and undergoes a phase retardation difference of less than 10 degrees for mutually orthogonal polarization states while travelling within the film undergoes reflection by the linear prisms.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A brightness enhancement film comprising:
a plurality of linear prisms disposed on a birefringent substrate, such that a light ray that enters the film from the substrate side and exits the film from the linear prisms side and undergoes substantially a same phase retardation for mutually orthogonal polarization states while travelling within the film, exits the film at an angle from a normal to the substrate that is greater than 20 degrees.

2. The brightness enhancement film of claim 1, wherein the substrate birefringence in a plane of the substrate is at least 0.02.

3. The brightness enhancement film of claim 1, wherein a difference between the phase retardations for the mutually orthogonal polarization states is less than about 10 degrees.

4. The brightness enhancement film of claim 1, wherein the linear prisms have peak angles in the range from 80 to 110 degrees.

5. A brightness enhancement film comprising:
a plurality of linear prisms disposed on a substrate and extending along a first direction, the substrate having principal refractive indices $n_x$ and $n_y$ in mutually orthogonal directions in a plane of the substrate, $n_x$ being greater than $n_y$, wherein the first direction makes an angle with a principal direction corresponding to $n_x$ such that a light ray that enters the film from the substrate side and undergoes substantially a same phase retardation for mutually orthogonal polarization states while travelling within the film undergoes reflection by the linear prisms.

6. The brightness enhancement film of claim 5, wherein the first direction makes an angle with a principal direction corresponding to $n_x$ that is less than 20 degrees.

7. The brightness enhancement film of claim 5, wherein $n_x$ is greater than $n_y$ by at least 0.02.

8. A brightness enhancement film comprising:
a plurality of linear prisms disposed on a substrate and extending along a first direction, the substrate having principal refractive indices $n_x$ and $n_y$ in mutually orthogonal directions in a plane of the substrate, $n_x$ being greater than $n_y$ by at least 0.04, wherein the first direction makes an angle with a principal direction corresponding to $n_x$ such that a light ray that enters the film from the substrate side and undergoes a phase retardation difference of less than 10 degrees for mutually orthogonal polarization states while travelling within the film undergoes reflection by the linear prisms.

* * * * *